(12) United States Patent
Kolar et al.

(10) Patent No.: US 8,457,354 B1
(45) Date of Patent: Jun. 4, 2013

(54) MOVEMENT TIMESTAMPING AND ANALYTICS

(75) Inventors: Clare E. Kolar, St. Paul, MN (US); Robert F. Foster, Ramsey, MN (US)

(73) Assignee: Target Brands, Inc., Minneapolis, MN (US)

( * ) Notice: Subject to any disclaimer, the term of this patent is extended or adjusted under 35 U.S.C. 154(b) by 452 days.

(21) Appl. No.: 12/833,499

(22) Filed: Jul. 9, 2010

(51) Int. Cl.
*G06K 9/00* (2006.01)

(52) U.S. Cl.
USPC ............................ 382/103; 348/143; 348/169

(58) Field of Classification Search
USPC .................................. 382/103; 348/143, 169
See application file for complete search history.

(56) References Cited

U.S. PATENT DOCUMENTS

| | | | |
|---|---|---|---|
| 5,969,755 A | 10/1999 | Courtney | |
| 6,185,314 B1 | 2/2001 | Crabtree et al. | |
| 6,628,835 B1 | 9/2003 | Brill et al. | |
| 7,246,740 B2* | 7/2007 | Swift et al. | 235/379 |
| 7,667,596 B2* | 2/2010 | Ozdemir et al. | 340/541 |
| 7,868,912 B2* | 1/2011 | Venetianer et al. | 348/143 |
| 2003/0004913 A1 | 1/2003 | Gutta et al. | |
| 2003/0048926 A1* | 3/2003 | Watanabe | 382/103 |
| 2004/0111454 A1 | 6/2004 | Sorensen | |
| 2005/0102183 A1 | 5/2005 | Kelliher et al. | |
| 2005/0169367 A1* | 8/2005 | Venetianer et al. | 375/240.01 |
| 2008/0031491 A1 | 2/2008 | Ma et al. | |
| 2008/0114633 A1 | 5/2008 | Wolf et al. | |
| 2008/0198231 A1* | 8/2008 | Ozdemir et al. | 348/159 |
| 2011/0316697 A1* | 12/2011 | Krahnstoever et al. | 340/540 |

OTHER PUBLICATIONS

Krahnstoever et al., "Intelligent Video for Protecting Crowded Sports Venues" Sep. 2009, Sixth IEEE International Conference on Advanced Video and Signal Based Surveillance, 116-121.*
A.W. Senior et al., "Visual Person Searches for Retail Loss Detection: Application and Evaluation", 5th International Conference on Computer Vision Systems, 2007, 10 pages.

* cited by examiner

*Primary Examiner* — Jason M Repko
*Assistant Examiner* — Katrina Fujita
(74) *Attorney, Agent, or Firm* — Merek, Blackmon & Voorhees, LLC

(57) ABSTRACT

In selected embodiments, a computer-implemented method for analyzing customer movement in a retail environment includes capturing an image of an individual at multiple locations within a retail environment and tracking the elapsed time between the individual's appearance at the various locations. For areas of the store at increased risk for shoplifting, the elapsed times may be compared to predetermined upper and/or lower elapsed time thresholds or windows to determine whether an individual is likely to commit a crime in the retail environment. The thresholds or window may be empirically determined based on analysis of historical security video footage and security incident records.

20 Claims, 7 Drawing Sheets

MOVEMENT TIMESTAMPING AND ANALYTICS

BACKGROUND

Video systems are commonly used to monitor commercial or retail locations such as stores, warehouses, athletic facilities, etc. In particular, video systems are be used to monitor different locations within the interiors of such facilities, including high traffic aisles, security sensitive areas, and the like. Such systems are also used to monitor locations near the exteriors of facilities, such as parking lots, loading docks, external doors, etc.

Video monitoring is performed for one or more reasons. For example, video monitoring in a jewelry store is used primarily for store security, and helps prevent theft and identify perpetrators, and is also useful in recovering merchandise after a theft has occurred. In different situations where theft prevention is of less concern video monitoring might be used primarily for safety purposes and to monitor for overflow capacity of a particular area.

Videos and images are stored for later retrieval and viewing. For example, surveillance video is archived in a device that retains and protects the video for a period of time. Archive systems protect videos and images from loss due to tampering, accidents, and equipment failure. Some systems have backup service, for example, through an external provider or using redundant internal systems.

Archived videos and images are selectively retrieved for analysis. For example, video of a roadway intersection is later retrieved to view an automobile collision for purposes of reconstructing the accident. Some archived videos and images are used in legal proceedings. For example, surveillance video of a convenience store checkout is often used as evidence against an accused thief or robber.

SUMMARY

In selected embodiments, a computer-implemented method for analyzing customer movement in a retail environment includes capturing an image of an individual at multiple locations within a retail environment and tracking the elapsed time between the individual's appearance at the various locations. For areas of the store at increased risk for shoplifting, the elapsed times may be compared to predetermined upper and/or lower elapsed time thresholds or windows to determine whether an individual is likely to commit a crime in the retail environment. The thresholds or window may be empirically determined based on analysis of historical security video footage and security incident records.

The details of one or more embodiments are set forth in the accompanying drawings and the description below. Other features and advantages will be apparent from the description and drawings, and from the claims.

DESCRIPTION OF DRAWINGS

This document describes these and other aspects in detail with reference to the following drawings.

Like reference symbols in various drawing indicate like elements.

DETAILED DESCRIPTION OF ILLUSTRATIVE IMPLEMENTATIONS

Some implementations provide an at least partly automated solution to detect behavior indicative of prohibited activities such as theft, fraud, or other crimes. For example, some activities are prohibited by law (e.g., theft, fraud, and other crimes), or by contract (e.g., a person agrees to refrain from the activity), or by policy (e.g., a property owner announces rules for those on the premises). For example, the owner of a retail establishment wishes to prevent customers or other visitors, or retail employees, from engaging in prohibited activities. Doing so helps provide a comfortable shopping environment for customers and a safe workplace for employees and reduces financial loss for the retailer.

In some implementations, a time-stamping security video system observes multiple locations of a retail environment. Attributes of persons observed within each of the locations (e.g., a person's size, shape, clothing colors) are stored along with timestamps and as people move among multiple locations, a collection of time-indexed records is created. One or more identifying characteristics are then determined for each person in the time-indexed records using image analysis and, based on this the person, are then identified in one or more additional location. That is, the determination is made that the same person occurs in the image records for two or more monitored locations. This collection of the time stamped records of locations where the person has been identified is then used to determine the durations of time the person has taken to move between various locations.

Predetermined time criteria are defined for one or more pairs of locations and, if the person's movement meets one or more of these criteria, a security notification is generated. For example, if a person is observed at a store entrance and is then spotted an unusually short time later at a high-value product display (e.g., product that are likely targets of shoplifters), the system notifies a store associate or security worker to observe or attend to the person more closely.

Figure 1:
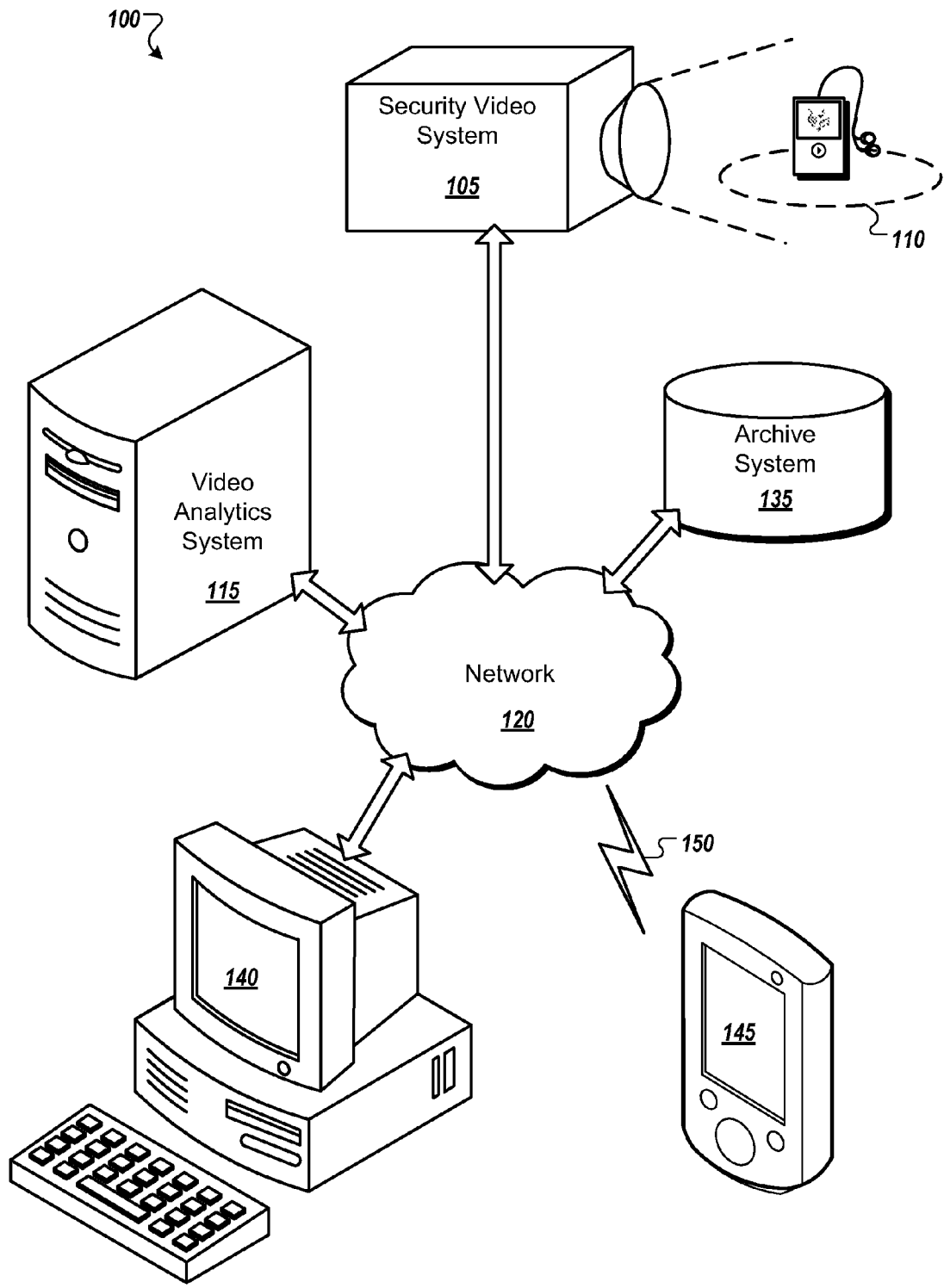
FIG. 1 is a conceptual diagram of a representative system for analyzing a person's movement.

FIG. 1 is a conceptual diagram of a representative system 100 for analyzing a person's movement. The system 100 includes at security video system 105. The security video system 105 is part of a collection of one or more image capture devices and computer-based processors (e.g., digital cameras, digital video recorders, and video digitizers). The security video system 105 captures and digitizes images of one or more locations 110 as electronic image data files. The security video system 105 associates captured images with time stamps.

The security video system 105 transmits the captured image to a video analytics system 115 over a communications network 120 (e.g., a local area network, a cellular network, or the Internet). The video analytics system 115 is a computer-based system that recognizes characters in the captured images. For example, the video analytics system 115 uses image recognition technology to detect human beings in the image and identify one or more parameters that characterize attributes of the detected character. Example processes for identifying characterizing parameters are discussed in connection with FIGS. 3A, 3B, and 4.

The video analytics system 115 characterizes attributes of the person using one or more parameters. The attributes are then used to uniquely distinguish a person from each of multiple persons visible in the same or another image. The security video system 105 associates those attributes with the time stamp and with the location where the image was captured. In some implementations, one or more identifying parameters are used, such as color, size, shape, gender, clothing element, facial feature, or other features of the person's body, appearance, or clothing. For example, the video security system identifies that a particular person has a beard and wears a blue jacket and tan pants. In some implementations, the video analytics system 115 is designed to also recognize items carried or transported by a person (e.g., a walking cane) but to ignore or filter out objects that occur too frequently to distinguish persons from each other. For example, a system implemented in a retail establishment is trained to not register shopping carts as characteristic attributes.

The video analytics system 115 transmits the parameters, location information, and time stamp to an archive system 135. The archive system 135 is a server computer that includes a collection of storage devices (e.g., hard drives, optical drives, tape drives, a RAID array) that securely stores a person's movement information, backs it up, and subsequently retrieves and serves the person's movement information to display devices when requested. The archive system 135 allows only authorized users to retrieve the person's stored movement information by comparing a requesting user's identity with an access control list to restrict the distribution of the person's stored movement information to only authorized users and/or authorized display devices. The archive system 135 optionally includes a web server that provides access to the person's stored movement information through a web browser.

The video analytics system 115 analyzes the person's stored movement information to determine if the same person has appeared in more than one location. When the person is known to have been recognized in more than one location (e.g., the person has moved between at least two locations in a store), then the time stamps associated with the recognitions are used to determine the amount of time the person has taken to move between the locations.

A computer 140 and a handheld device 145 (e.g., cell phone, PDA) requests and displays analyzed movement information to one or more users. The computer 140 sends a request over the network 120 to the video analytics system 115 to request analyzed movement information from the video analytics system 115. The handheld device 145 communicates with the network 120 over a wireless communications link 150 (e.g., WiFi, cellular, Bluetooth, infrared) to request analyzed movement information from the video analytics system 115.

Figure 2:
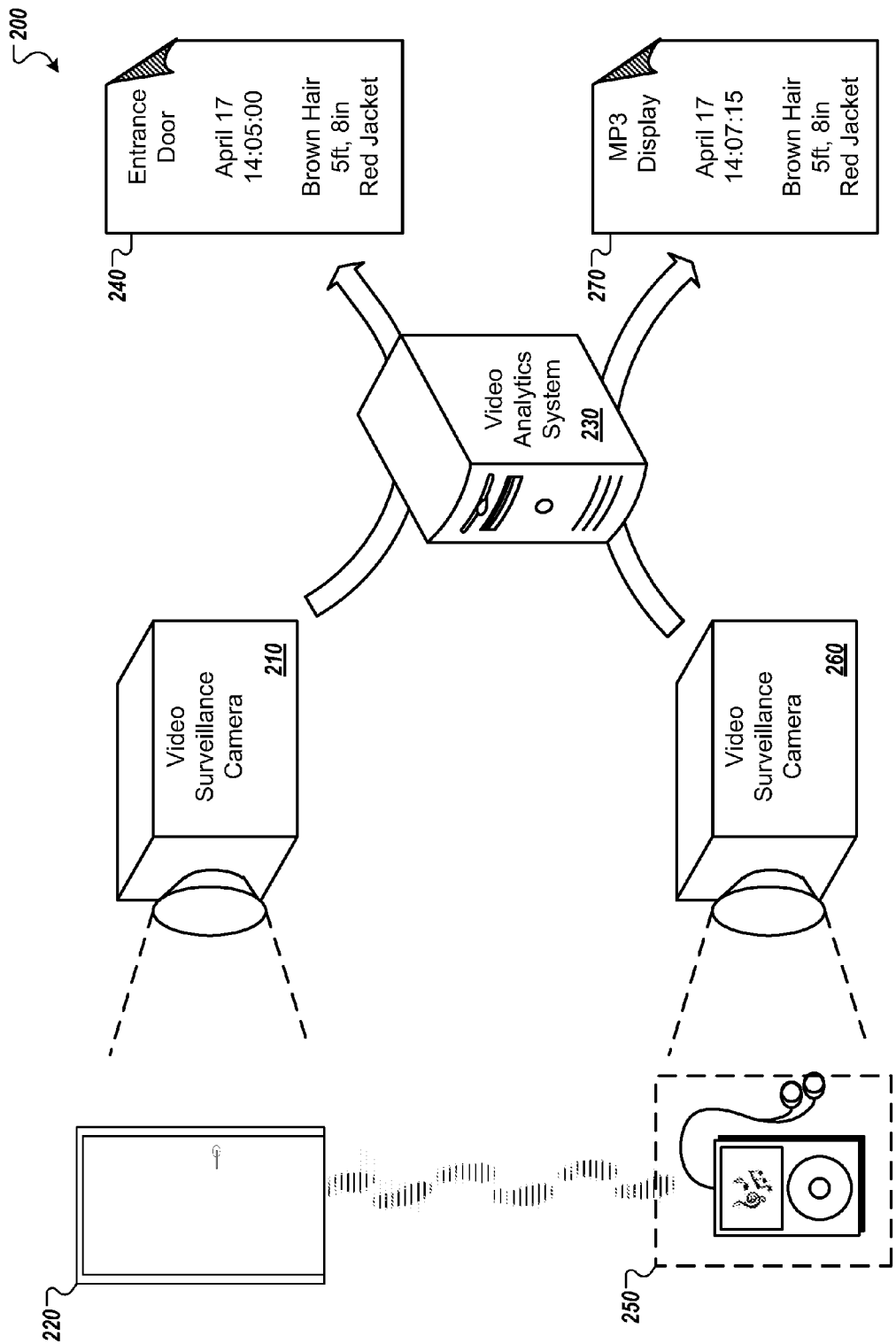
FIG. 2 is an illustration of an example time-stamping of a person's movement.

FIG. 2 illustrates an example of time stamping a person's movement. In the illustrated example, a video surveillance system 200 includes a video surveillance camera 210 which captures images of a location such as an entrance door 220. In some implementations, the video analytics system 230 corresponds to the video analytics system 115 of FIG. 1. When a person enters the door 220, the person's presence is recognized by the video analytics system 230.

The captured image is analyzed by the video analytics system 230 to determine visual parameters that are used to uniquely characterize the person. In some implementations, parameters that are used to characterize the person include the colors of the person's various items of clothing, the person's estimated height and weight, the color of the person's hair, facial features (e.g., eyeglasses, makeup, facial hair, eye color), shape (e.g., hair style, posture), carried or worn items (e.g., bulky coats, large purses or bags, jewelry), groupings (e.g., a family moving through the store as a unit), or other characteristics that are used to describe the visual attributes of a person.

In the present example, the video analytics system 230 captures one or more images of a person at the entrance door 220 on April 17 at the time 14:05:00. For example, the video surveillance camera 210 captures a video sequence of images, or one or more separate still images, of the area by the entrance door 220. The person appears as a character in at least one image. The video analytics system 230 analyzes the captured image to extract information that describes visual characteristics of the character. In the illustrated example, the character is determined to have brown hair, be approximately 5'8" tall, and wear a red jacket.

The video analytics system 230 creates a record 240 of the observation. The record 240 includes information such as the time and location of the observation, as well as the characterizing information about the character. The record 240 is stored, for example, by the archive system 135 for later retrieval and analysis.

The person then moves to a second location, such as an MP3 player display 250 that is monitored by a video surveillance camera 260. The video surveillance cameras 210 and 260 are positioned to capture images of selected locations within a retail environment. For example, locations that are of particular interest to monitor include entrances, exits, hallways leading to secluded areas, checkout aisles, or customer service areas. Other locations of particular interest include shelves, aisles, counters, or other displays of products, including products that are high-risk theft items such as media players, watches, cameras, DVDs, colognes, perfumes, or other such items.

When the person nears the MP3 player display 250, the video surveillance camera 260 captures one or more images of the person. Here, the image is captured on April 17 at the time 14:07:00. The video analytics system 230 analyzes the captured image to extract information that describes visual characteristics of the character. In the illustrated example, the character is characterized as having brown hair, having a height of approximately 5'8", and wearing a red jacket. The video analytics system 230 creates a record 270 of the observation of the character. The record 270 includes information such as the time and location of the observation, as well as the characterizing information about the character. The record 270 is then stored for later retrieval and analysis.

The video surveillance system 200 includes one or more image capture devices. In some implementations, multiple cameras are placed at respective different locations, for example, as the video surveillance cameras 210 and 260 above. As another example, a single image capture device can be used to cover two or more separate areas, for example, by a relocation, pan, tilt, and/or roll of the device between shots.

The stored records 240 and 270 are analyzed, for example, by the video analytics system 230 to determine if one person appears at two or more locations within the store. For example, all records created by the video analytics system 230 are analyzed to find similarities between two or more of the records. Here, records 240 and 270 both indicate a character standing approximately 5'8" tall, having brown hair, and wearing a red jacket. Based on this, and optionally one or more other factors, the video analytics system 230 determines that the first and second detected characters correspond to one person. That is, the records 240 and 270 are matched with each other to the exclusion of multiple other records which do not describe the corresponding characteristics.

The stored records 240 and 270 are then analyzed to determine how long the person has taken to move between various locations in the store. For example, the records 240 and 270 are compared to determine that the person took two minutes and fifteen seconds (the difference between 14:07:15 and 14:05:00) to travel from the entrance door 220 to the MP3 player display 250.

The time the person has taken to move between the entrance door 220 and the MP3 player display 250 is compared against one or more predetermined time limits. For example, a time criterion of less than three minutes has previously been assigned to the entrance door 220 and the MP3 player display 250. That is, a person at the entrance door 220 who less than three minutes later appears at the MP3 player display 250 meets the above time criterion. This is an example of an upper time limit: the criterion is met whenever the detected time difference is less than the upper time limit. Similarly, in some implementations, the criterion also or instead includes a lower time limit. That is, the time criterion is met if a person observed at a first location does not appear at a second location until after a time longer than the lower time limit. In examples wherein a time criterion is met, the video analytics system 230 notifies users (e.g., security guards, store associates) of the person's location, visible attributes, and/or suspected pattern of behavior. For example, detecting unusually fast or slow movements helps identify persons whose behavior does not conform with what is expected. Appropriate measures are taken upon detection, such as dispatching an employee to assist a customer in need of help, or alerting the police or other security personnel.

In some implementations, the notification is generated in real time (e.g., virtually instantly when the time criterion is met). For example, this provides the advantage that protective or investigative measures are initiated essentially at the same time as, or even before, the prohibited behavior. Some implementations use the detection of a met time criterion to flag records for future investigation. For example, the system analyzes many images stored in a repository and registers those instances where a person's travel between monitored locations meets at least one time criterion.

Figure 3A:
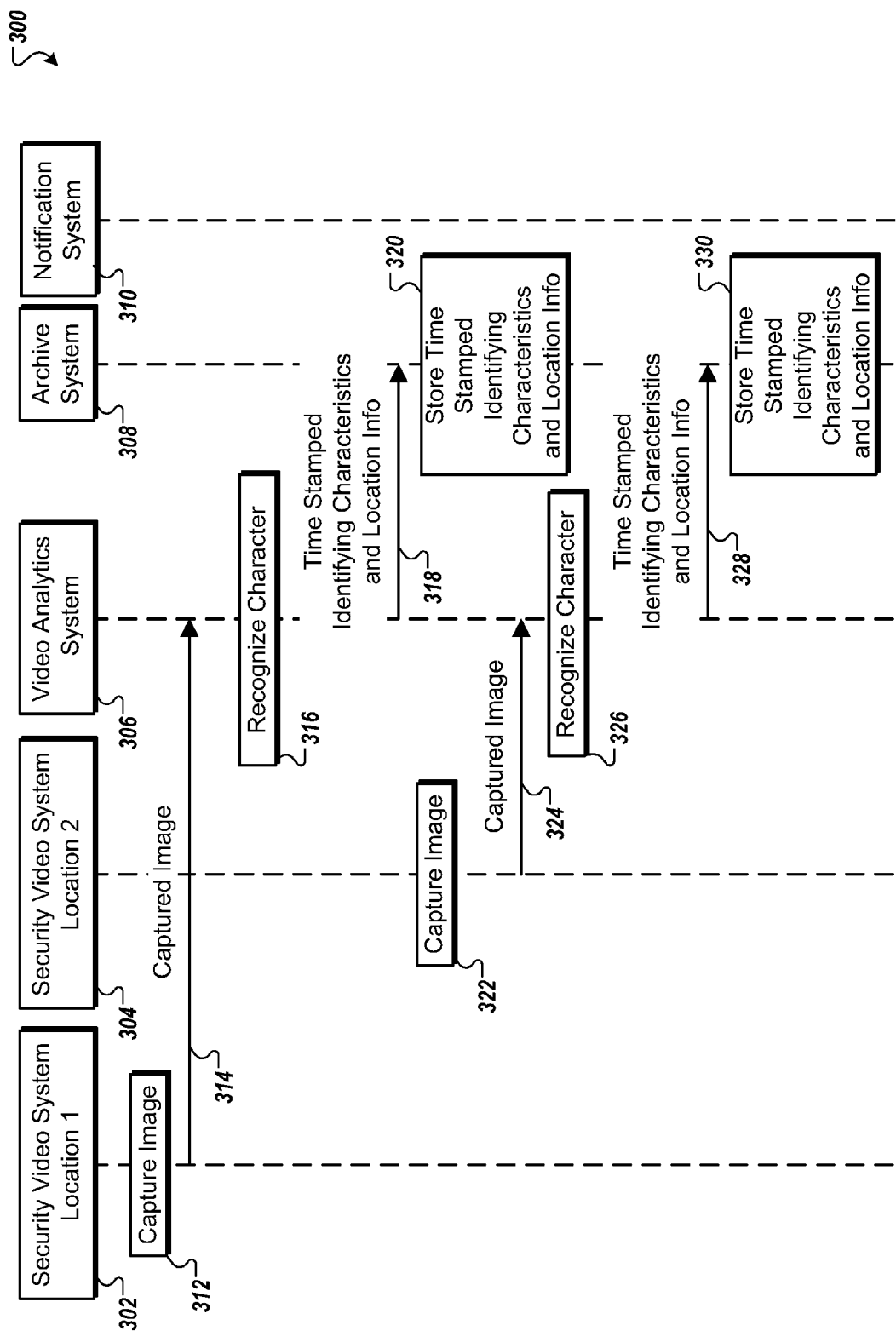
FIGS. 3A and 3B are a timeline diagram of example interactions among various components of an example system for analyzing a person's movement.
Figure 3B:
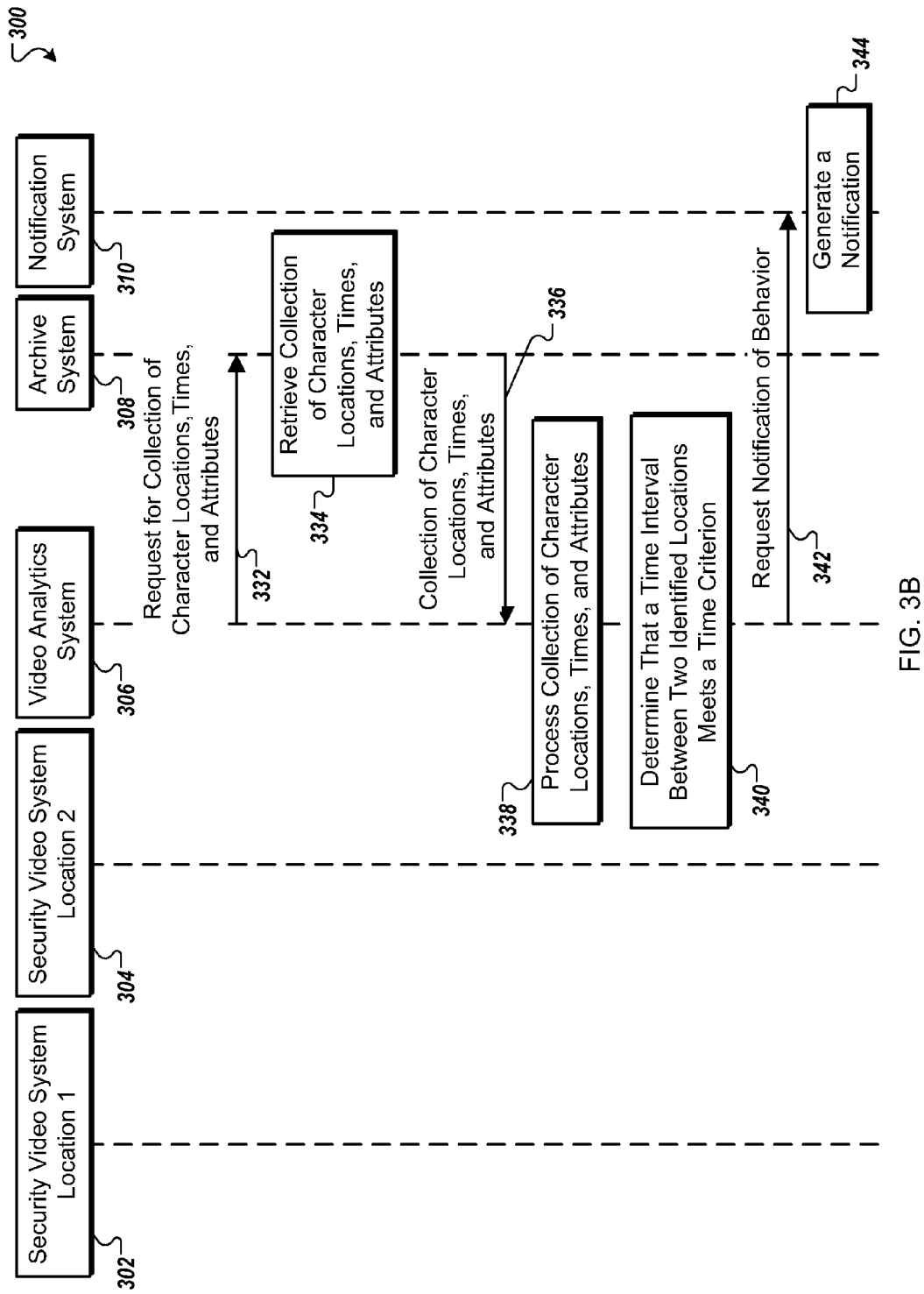

FIGS. 3A and 3B are a timeline diagram of a collection of example interactions 300 among various components of an example system for analyzing a person's movement. In some implementations, the interactions 300 are carried out by one or more of the systems 100 and 200.

The interactions 300 begin when a security video system 302 captures (312) an image at a first location and transmits (314) the captured image to a video analytics system 306. The video analytics system 306 receives the transmitted image and analyzes it to detect whether a character is present in the image. If a character is present in the image, the video analytics system 306 recognizes (316) the character and identifies characterizing attributes of the character, such as the character's approximate height, weight, color of clothing, or other attributes that are used to recognize a person represented by the character. The characterizing attributes of the character are associated with information identifying the location and time at which the character was recognized.

The video analytics system 306 transmits (318) a collection of time stamped identifying characteristics and location information to an archive system 308. The archive system 308 stores (320) the time stamped identifying characteristics and location information, for example, in a database or other information storage repository.

After the first image is captured (312), a security video system 304 captures (322) an image at a second location and transmits (324) the captured image to the video analytics system 306. The video analytics system 306 receives the transmitted (324) image and analyzes it to recognize if a character is present in the image. If a character is present in the image, the video analytics system 306 recognizes (326) the character, identifies characterizing attributes of the character, and associates the attributes with information identifying the location and time at which the character was recognized.

The video analytics system 306 transmits (328) a second collection of time stamped identifying characteristics and location information to the archive system 308. The archive system 308 stores (330) the time stamped identifying characteristics and location information.

Referring now to FIG. 3B, the video analytics system 306 transmits (332) a request for collection of character locations, times, and attributes to the archive system 308. The archive system 308 responds to the request by retrieving (334) a collection of character locations, times, and attributes, and replies by transmitting (336) the collection to the video analytics system 306.

The video analytics system 306 processes (338) the collection of character locations, times, and attributes. In some implementations, the processing includes identifying one or more unique characters in the collection. The processing by the video analytics system 306 analyzes pairs of locations at which an individual person has been identified and uses the associated time stamp information to determine the lengths of time the person has taken to travel between the pairs of locations. The video analytics system 306 compares the lengths of time against one or more predetermined criterion lengths of time that are associated with various pairs of locations.

The video analytics system 306 then determines (340) that a time interval between the two identified locations meets a time criterion. If a person is determined to have taken less or more than the pre-specified amount of time to move between monitored locations, then the time criterion is met.

When the video analytics system determines (340) that a time criterion is met, the video analytics system 306 transmits (342) to a notification system 310 a request to generate a notification about the person's behavior. In some implementations, the notification system includes a computer display, a wireless device (e.g., a pager, PDA, cellular telephone, portable price scanner), a public address system, or another system for generating notifications to sales associates or security officers. Upon receipt of the request, the notification system 310 generates (344) a notification about the detected behavior. The notification is generated to one or more recipients.

Figure 4:
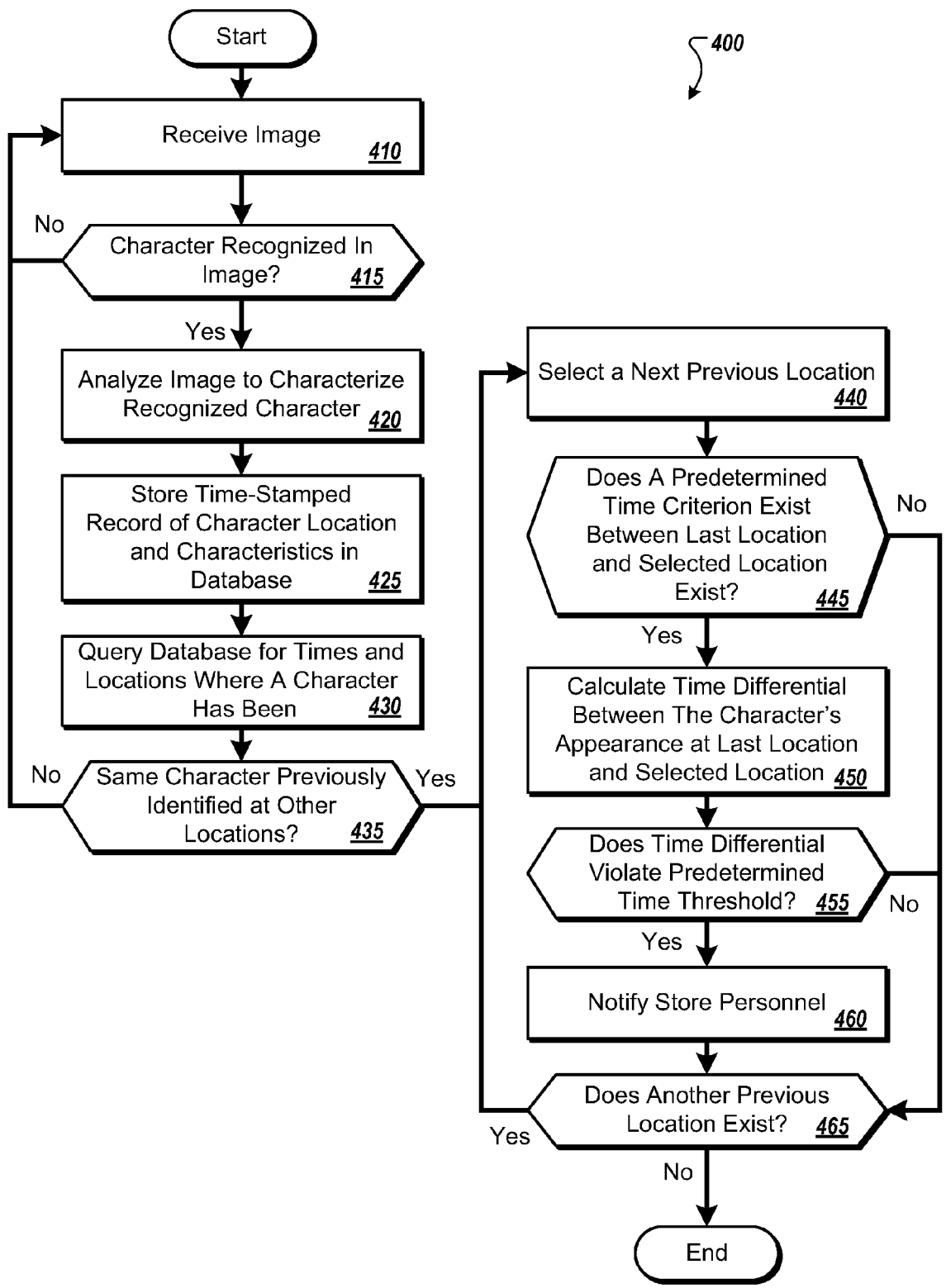
FIG. 4 is a flowchart of a representative process for analyzing a person's movement.

FIG. 4 is a flowchart of a representative process 400 for analyzing a person's movement. In some implementations, the process 400 is carried out by the video analytics systems 115, 230, or 306. The process 400 starts when an image is received (410). For example, the security video system 105 captures and digitizes an image of a location and transmits that image to the video analytics system 115 for processing.

If a character is not detected (415) within the image, then the process 400 readies itself to receive (410) another image. Otherwise, if an image of a person is recognized (415) within the image, then the image is analyzed (420) to characterize the recognized character.

A time-stamped record of the character's location and characteristics are stored (425) in a database. In some implementations, the time-stamp represents the time at which the image was captured or the time at which the image was received (410). In some implementations, the location record describes the store area captured by the received (410) image or a store sub-area within the image in which the character was identified.

The database is then queried (430) for a collection of times and locations where a character has been. For example, the database is queried (430) for all records that include characteristics that describe a 5'3" woman with a blue coat and a red shoulder bag. In some implementations, the character is the person recognized (415) in the image. For example, the characteristics derived from a recently analyzed (420) image are used to trigger the query (430) of the database. In some implementations, the database is queried (430) for a collection of time indexed locations where any character has been identified and that collection is then sorted and/or filtered to determine one or more sub-collections wherein each sub-collection corresponds to times and locations in which an individual character has been identified.

In some implementations, the query (430) is limited to return only those records which were time-stamped within a predetermined timeframe. In an example wherein several different people having similar physical appearances have visited a retail store over a period of days or weeks, the query is modified to reduce misidentification of persons by requesting only those records that have been stored since the store opened for business that same day, or within the last day, hour, or other period of time. In another example, the query is limited to only those collections of records that describe the locations at which the same character has been identified but do not include an entry that identifies the person exiting the space (e.g., the query only returns information about persons who are probably still within the building).

In some implementations, a combination of exit records and time limits is used. For example, the query is limited to assume that people generally do not stay in the space for more than two hours and therefore ignores records for a person who has not been seen in more than two hours even if the person has not been identified while exiting the space (e.g., the person was obscured from the exit camera's view while the person was leaving).

If the same character is determined (435) to have not been previously identified at other locations, then the process 400 readies itself to receive (410) another image. For example, the image of the identified character was captured as the person first walked through an entrance, possibly making this the first and only record of the person in the database. However, if the same character is determined (435) to have been previously identified at other locations, then a next previous location is selected (440) from the collection. For example, the characteristics stored along with time and location information for two records in the database is compared, and if the characteristics used to describe the person identified in both locations have a strong correlation (e.g., the two sets of independently analyzed characteristics are 90% similar), then the first character and the second character are determined (435) to correspond to one person.

If a predetermined time criterion has not been defined for the last location and the selected location, then an additional determination (465) is made whether another previous location exists in the collection. For example, various pairs of locations are associated with predetermined time limits that describe criteria that are used to generate notifications, as will be described below. Otherwise, if a predetermined time criterion is determined (445) to exist between the last location and the selected location, then a time differential is calculated (450) between the character's appearance at the last location and the selected location.

If the time differential does not meet a predetermined time criterion (455), then an additional determination (465) is made whether another previous location exists in the collection. However, if the time differential meets the time criterion (455), then a notification is generated (460). In some implementations, the notification (460) includes information that describes the recognized character, such as when and where the character was last seen, as well as the analyzed (420) characteristics of the character, to help store personnel locate and visually identify the person in question. For example, one or more captured images are distributed.

If another previous location is determined (465) to exist in the collection, then it is selected (440) for additional processing. Otherwise, if no previous location exists, then the process 400 ends. In some implementations, the process 400 repeats by returning to receive (410) another image.

As described previously, the length of time a person takes to move between two locations is used to decide whether to generate a notification of store personnel, or take other action. In other implementations, a person's movement among several locations is analyzed to determine whether the person's actions are indicative of an event that warrants further attention from store personnel, for example, as will now be described.

Figure 5:
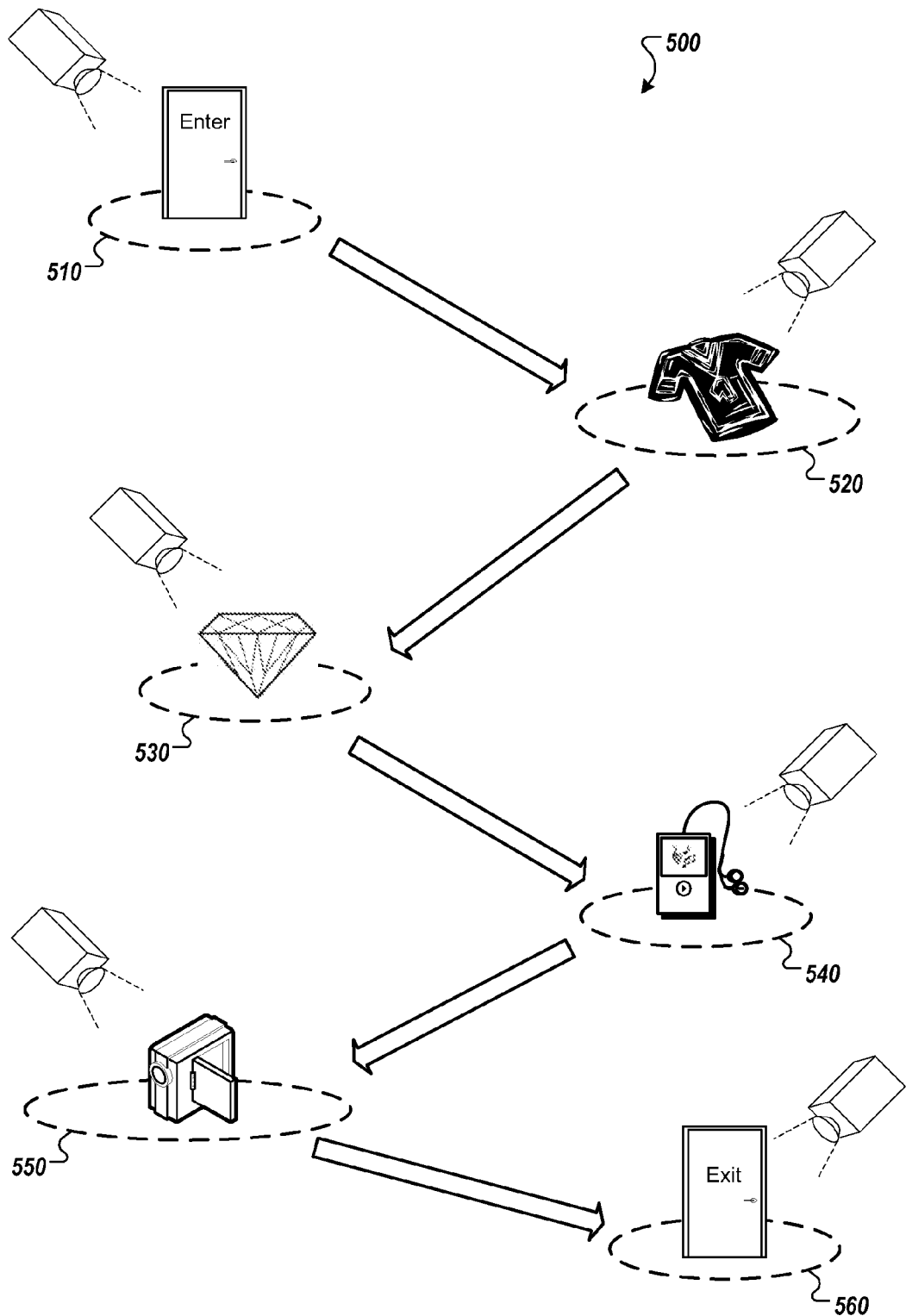
FIG. 5 illustrates an example of a person's movement among several locations.

FIG. 5 illustrates an example of a person's movement 500 aong several locations. For example, using techniques described herein, a person is identified at an entrance location 510, then at a clothing display location 520, then at a jewelry display location 530, then at an electronics display location 540, then at a video camera display 550 and then at an exit location 560. In some implementations, store employees are notified if the person is identified as having moved quickly among a number of locations. For example, various locations in a store are associated with various weighting factors (e.g., displays that are likely targets for shoplifting are given different weighing values than other displays). A combined score of the totalized weighing values of visited locations is generated and associated with the character representing the person. In a sense, the combined score indicates whether the person has visited a variety of areas in the store or predominantly high-risk areas. When a person appears at a location, such as the exit 560, with an exceptionally high combined score, a notification is generated. Any technique for combining weighting factors is used, for example adding or multiplying individual factors.

In some implementations, the combined score is adjusted one or more times. For example, the value of each weighting factor or the character's combined score is reduced based on the time it takes the person to move between locations. For example, this allows the system to distinguish between a person who leisurely browses a number of high-value displays from a person who moves rapidly among a number of locations before appearing at a location such as the exit location 560. As another example, the combined score (or individual weights) is reduced when the person appears at certain locations. For example, compare the situation of one person visiting high-risk areas of a store and then appearing at the exit door without visiting the cash register with that of another visitor of the high-risk areas who passes through the cash register line before heading for the exit door. The latter person accumulates a high combined score by visiting the high-risk areas but the score is reduced at checkout. The former person, in contrast, still has the high combined score at the exit door which, in some situations, triggers a notification.

In some implementations, the time a person spends in various locations is considered when calculating the amount of time a person has taken to move between locations. For example, time spent in checkout lanes, guest services areas, and restrooms are credited or ignored when determining whether a person meets a specific time criterion. In an example, a time limit of 30 minutes is associated with the entrance location 510 and the exit location 560, wherein a person meets the time criterion if the person takes longer than 30 minutes to exit the store after entering. However, if the person is identified as having spent ten minutes in a customer service line and another five minutes waiting to check out, then fifteen minutes are deducted from the person's total time.

Although exemplary embodiments have been described with reference to the figures, other implementations are possible.

Figure 6:
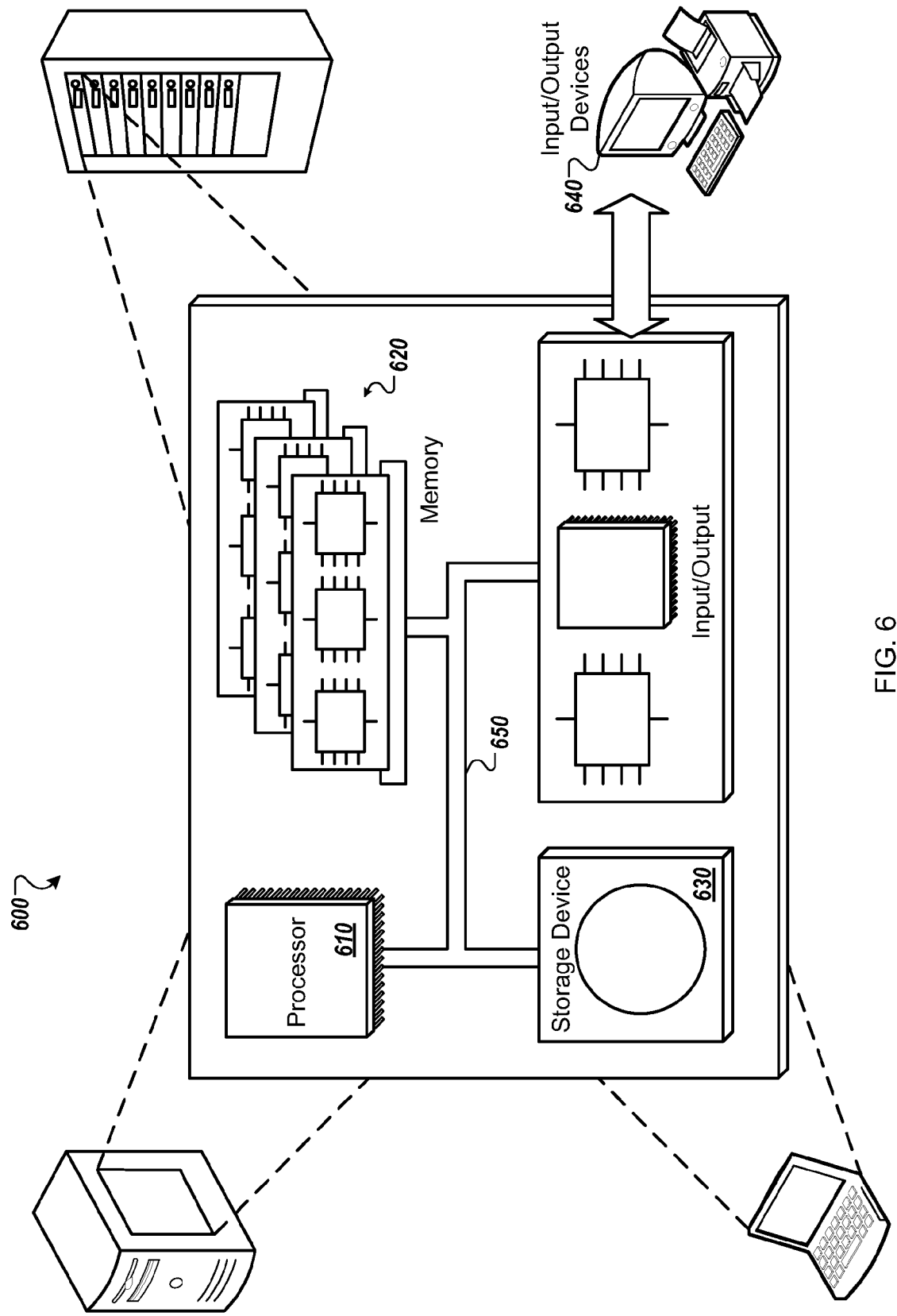
FIG. 6 is a schematic diagram of an example of a generic computer system.

FIG. 6 is a schematic diagram of an example of a generic computer system 600. The system 600 can be used for the operations described in association with the method 300 according to one implementation. For example, the system 600 may be included in either or all of the video analytics systems 115, 230, 306, the security video system 105, the archive systems 135, 308, the computer 140, the handheld device 145, and the notification system 310.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages and it can be deployed in any form, including as a stand-alone program or as a module, component, subroutine, or other unit suitable for use in a computing environment.

Suitable processors for the execution of a program of instructions include, by way of example, both general and special purpose microprocessors and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory including, by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope of the following claims.

What is claimed is:

1. A method for analyzing a person's movement in a retail environment, comprising:

capturing a first image of a first person at a first location at a first time;

capturing a second image of a second person at a second location, remote from the first location, at a second time;

identifying, by analyzing with at least one computing device, one or more characteristics associated with the image of the first person and the image of the second person;

determining, by analyzing with the at least one computing device, whether the first person and the second person are likely to be the same individual;

in response to a determination that the first person is likely to be the second person, comparing, with the at least one computing device, the elapsed time between the first time and the second time with a maximum elapsed time threshold that is indicative of a likelihood that the first person has committed or will commit a crime within the retail environment; and determining, by analyzing with the at least one computing device, how many of a plurality of locations in a retail environment the first person traveled to within a predetermined period of time include a merchandise display that is likely a target of shoplifting.

2. The method of claim 1, wherein the maximum elapsed time threshold is based at least in part on the distance between the first location and second location and the nature of the retail environment.

3. The method of claim 1, wherein the maximum elapsed time threshold is based in part on an empirical assessment of data associated with previous monitoring of the first location and the second location.

4. The method of claim 1, further comprising determining whether the elapsed time is above a minimum elapsed time threshold.

5. The method of claim 4, wherein the minimum elapsed time threshold and the maximum elapsed time threshold cooperatively define an elapsed time window indicative of an increased likelihood that the first person has committed or will commit a crime within the retail environment.

6. The method of claim 1, wherein the one or more characteristics comprise color, size, shape, gender, clothing, facial feature, body feature, an item associated with the person, or combinations thereof.

7. The method of claim 1, wherein the first location is proximate an entry to the retail environment.

8. The method of claim 1, wherein the first location is proximate a product display including items at increased risk for shoplifting.

9. A system for analyzing a person's movement, the system comprising:

an electronic image capture system configured to capture (i) a first image of a first scene of a first location and (ii) a second image of a second scene of a second location remote from the first location, the first and second images being associated with first and second time stamps, respectively;

at least one computing device having instructions to recognize (i) a first character in the first image and (ii) a second character in the second image, wherein first and second parameters characterize attributes of the first and second characters, respectively; and a video analytics system having instructions that (i) determines, using at least the first and second parameters, that the first and second characters correspond to one actor; (ii) determines whether a predetermined time criterion exists between the first scene and the second scene; (iii) compares a maximum elapsed time criterion with a time difference between the first and second time stamps only if a predetermined time criterion exists between the first scene and the second scene, the maximum elapsed time criterion is indicative of the likelihood that the first character will commit a crime; and (iv) determines how many of a plurality of locations in a retail environment the first character traveled to within a predetermined period of time include a merchandise display that is a likely target of shoplifting.

10. The system of claim 9, wherein each of the first and second parameters includes a parameter selected from: color, size, shape, gender, clothing, facial feature, body feature, an item associated with the actor, and combinations thereof.

11. The system of claim 9, wherein the video analytics system further determines whether the time difference is greater than a minimum elapsed time threshold, thereby determining whether the elapsed time is within an elapsed time window.

12. The system claim 11, wherein the elapsed time window is based at least in part on previous monitoring of the first and second scenes using the electronic image capture system.

13. The system of claim 12, wherein the previous monitoring comprises:

performing observation over a period of time, using the electronic image capture system, of at least part of an area that includes the first and second scenes; and identifying, among multiple actors in the area, a first actor who engages in prohibited behavior during the period of time;

wherein the time limit is defined based at least in part on the observation of the first actor.

14. The system claim 9, wherein both the first and second scenes include a retail store ingress or egress.

15. The system claim 9, wherein both the first and second scenes include a retail product display.

16. The system claim 15, wherein only one of the first and second scenes includes products at an increased risk of shoplifting.

17. The system claim 15, wherein the first and second scenes both include products at an increased risk of shoplifting.

18. The system of claim 9, wherein only one of the first and second scenes include a retail ingress.

19. The system of claim 9, wherein the actor is a human.

20. A computer-implemented method of analyzing an individual's movements in a retail environment, comprising the steps of:

operating a video surveillance system to monitor a plurality of locations at a retail environment, at least some of the plurality of locations include a merchandise display that is a likely target of shoplifting;

determining, by analyzing with at least one computing device, a plurality of locations at the retail environment that a first individual travels to within a predetermined period of time and assigning a crime score to the first individual based at least in part on how many of the plurality of locations that the first individual traveled to within the predetermined period of time include a merchandise display that is a likely target of shoplifting, the at least one computing device being configured to differentiate the first individual from other individuals at the retail environment;

determining the elapsed time the first individual traveled from a first location at the retail environment to a second location of the retail environment, at least one of the first location and the second location includes a merchandise display that is a likely target of shoplifting;

adjusting the crime score of the first individual based at least in part on the elapsed time the first individual traveled from the first location to the second location; and, generating a security notification specific to the first individual if the first individual's crime score exceeds a predetermined value.

\* \* \* \* \*